Patented Oct. 28, 1924.

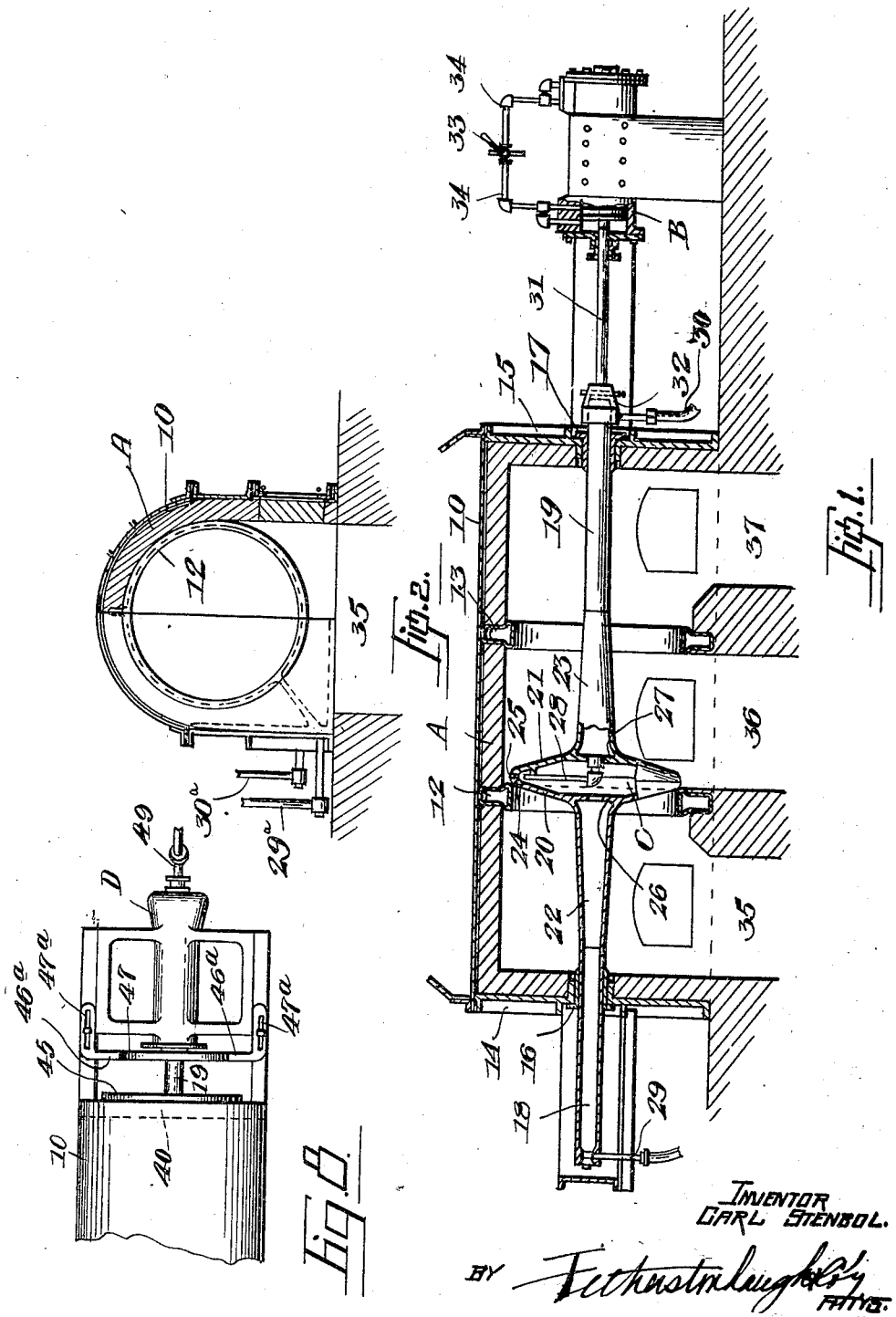

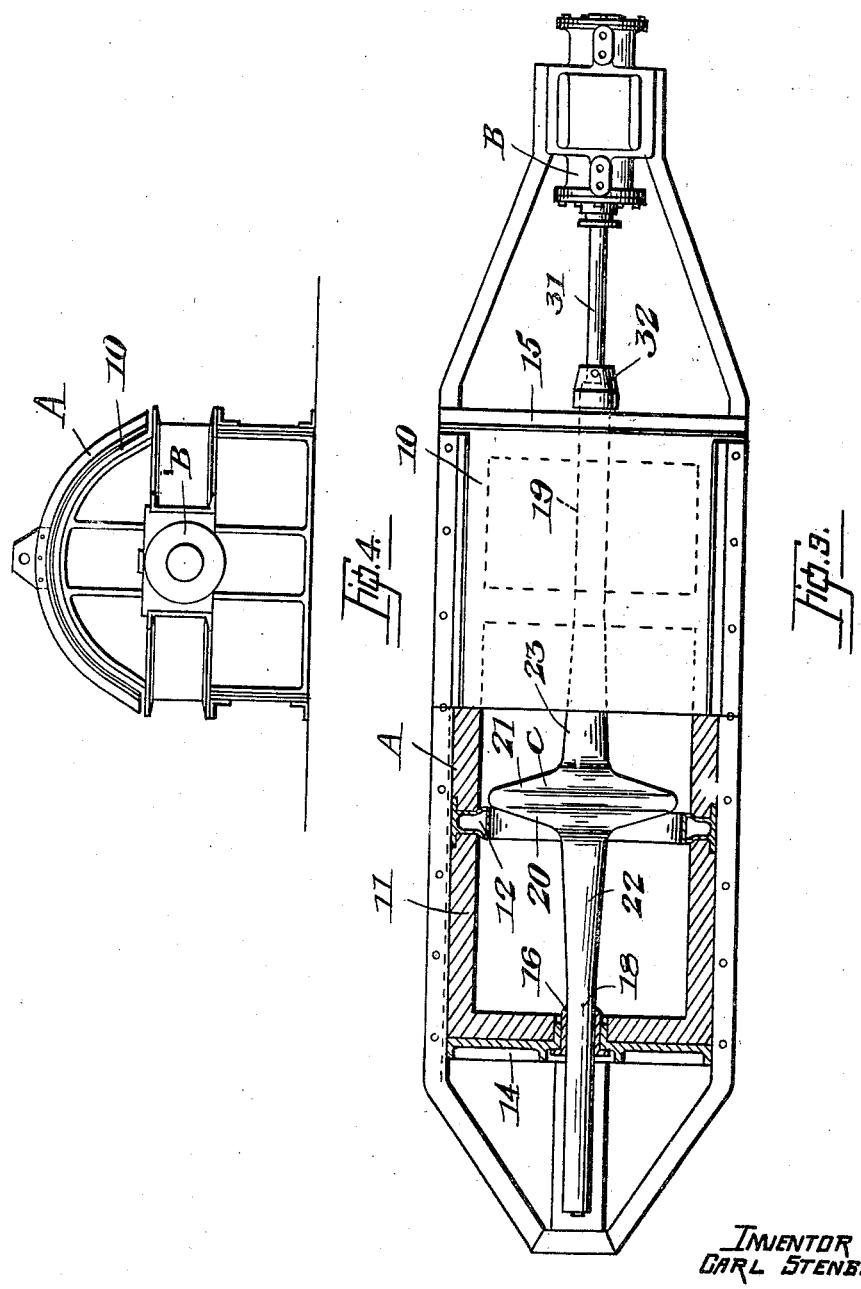

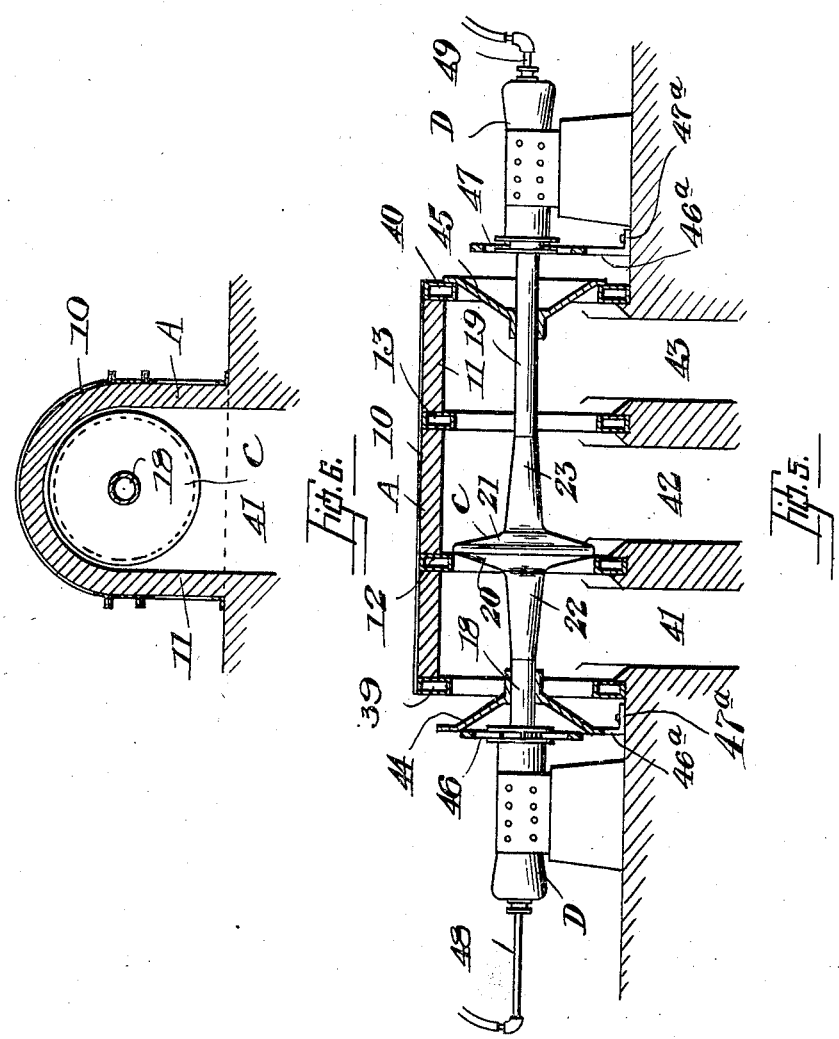

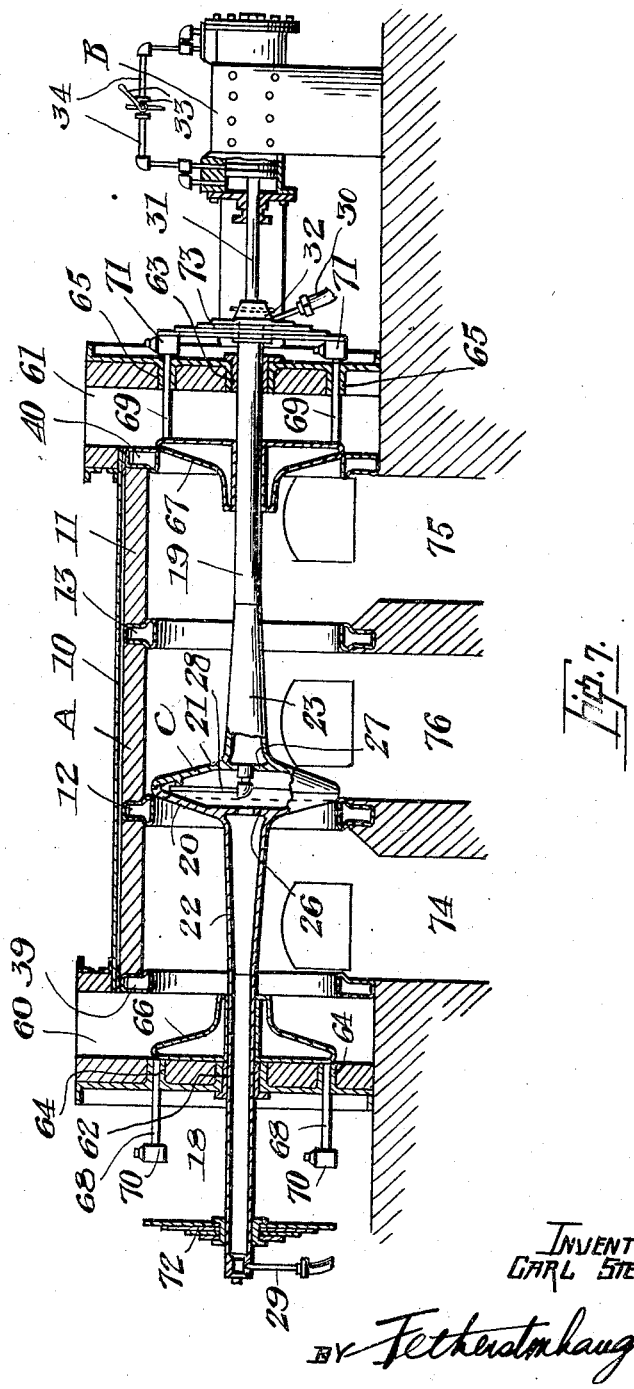

1,513,015

UNITED STATES PATENT OFFICE.

CARL STENBOL, OF SAULT STE. MARIE, ONTARIO, CANADA.

GAS OR AIR REVERSING VALVE.

Application filed August 16, 1920. Serial No. 403,972.

*To all whom it may concern:*

Be it known that I, CARL STENBOL, a subject of the King of Great Britain, a resident of the town of Sault Ste. Marie, Province of Ontario, Dominion of Canada, have invented certain new and useful Improvements in Gas or Air Reversing Valves, of which the following is a specification.

This invention relates to improvements in gas or air reversing valves designed for use on regenerator furnaces, such as open hearth, reheating, pit furnaces, etc., and the objects of the invention are to render the valve self-contained and simple in construction and operation, to provide a prime mover or movers, and bearings for the valve on the same stringers, and clear of the brick work, pansion and contraction of the brick work, so that at all times the valve and prime mover or movers and the moving and coacting parts thereof will be in perfect alignment.

Further objects are to construct the valve sectional, each section having a valve face and coacting conduit and stem, the two sections forming a joint at the outer periphery of the valve, thereby making the joint at the strongest part thereof, to provide an adequate cooling means for the valve and valve seats, and to provide adjustable stops to coact with the air valves, and govern the opening of the same.

Further objects are to adapt the valve to the four-way type, and generally to adapt the several parts to better perform the functions required of them.

With the above and other objects in view, the invention consists essentially of the improved construction particularly described and set forth in the following specification and accompanying drawings forming part of the same.

In the drawings:

Figure 1 is a longitudinal section of my improved valve used as a gas valve, and showing the cooling means for the valve, and also the prime mover whereby the valve is moved longitudinally.

Figure 2 is a cross section of the same.

Figure 3 is a plan view of the improved valve, one-half of the casing being in section.

Figure 4 is an end view of the valve casing showing the prime mover.

Figure 5 is a longitudinal section of my improved valve adapted for use as an air valve.

Figure 6 is a cross section of the same.

Figure 7 is a longitudinal section of my improved valve constructed as a four-way valve. Fig. 8 is a fragmentary plan view of the device shown in Fig. 5.

Like characters of reference refer to like parts in the several figures.

Referring to the drawings, A represents the improved valve comprising an outer metal casing 10 having a fire brick lining 11, the casing being provided intermediate its length with annular hollow valve seats 12 and 13, which are designed to be cooled by water or other fluids which circulate through the said valve seats.

The ends of the casing 10 are closed by covers 14 and 15 carrying bearings 16 and 17, which are in alignment with the longitudinal axis of the casing, and in these bearings, the valve stems 18 and 19 are slidably mounted.

The valve C is provided with a double face, that is to say its front and rear faces coact with the valve seats 12 and 13 respectively, and the valve is formed of two sections 20 and 21 which have conical longitudinal conduits 22 and 23, which communicate with the hollow valve stems 18 and 19.

The two sections 20 and 21 of the valve C have their coacting ends flanged as shown at 24 and 25 to engage with each other, so that the joint of the valve is at the strongest possible point.

At the junction of the conical conduits 22 and 23 with the valve sections, transverse walls 26 and 27 are provided, each having a central orifice therethrough.

From the orifice in the wall 27 a pipe 28 extends radially through the hollow valve C and this pipe communicates with the conduit 23.

On the stem 18 a water inlet pipe 29 is supplied which is connected to a suitable source of water supply, and a water outlet pipe 30 is connected to the end of the stem pipe 19, so that a positive circulation of cooling fluid takes place through the stem 18, conical conduit 22, orifice in the wall 26, the valve C, the pipe 28, the conical conduit 23, the stem 19, and the outlet pipe 30. Outlet and inlet pipes 29ª and 30ª are provided to circulate the water through the valve seats as illustrated in Figure 2.

The valve stem 19 and the piston rod 31 of the prime mover B are connected by suitable cotter means 32. Motive fluid is delivered to the prime mover B through suitable valve and pipe means 33 and 34. Communicating with the valve casing 10 are a plurality of flues, namely the gas flue 35, checker flue 36 and stack flue 37.

The valve C is actuated by the prime mover B, and will be moved horizontally to coact with one of the valve seats 12 and 13.

When the valve C is in the position shown in Figure 1, the outcoming gases from the furnace pass through the checker flue 36 into the stack flue 37. When the valve C is moved longitudinally to engage the valve seat 13, then the incoming gases will enter the gas flue 35, and pass into the checker flue 36, and the stack flue 37 will be cut off by the gases from the said flues.

This valve is also adapted for an air inlet valve as illustrated in Figure 5, in which the casing 10 carries hollow annular valve seats 12 and 13, and the ends of the casing 10 are open, and are provided with hollow annular valve seats 39 and 40. The casing is lined with fire brick work 11, and communicates with flues 41, 42 and 43, which are respectively checker, stack and checker flues.

The valve C is of the same construction as has been described, and it is deemed unnecessary to further enlarge upon the same.

On the stems 18 and 19, air valves 44 and 45 are slidably mounted, and coact with the stops 46 and 47, which control the opening of the said air valves, so that an adequate supply of air is delivered to the casing 10.

The stems 18 and 19 are slidably mounted in the prime movers D, which control the longitudinal movement of the valve C, and the said stems are connected to the inlet and outlet water pipes 48 and 49, whereby circulating cooling water is delivered to the valve C.

The prime movers D may be hydraulic or other suitable power.

When the valve C engages with the valve seat 12 as shown in Figure 5, then the air valve 44 is open, and the air valve 45 is closed, and the air entering the casing 10 passes directly into the checker flue 41.

The gases from the furnace pass through the checker flue 43 and are delivered to the stack flue 42. When the valve C is moved longitudinally by one of the prime movers D, the valve coacts with the valve seat 13, and the valve 45 is opened, and the valve 44 closed.

The air entering the casing 10 through the open end thereof, passes directly into the checker flue 43. The gases from the furnace pass through the checker flue 41 into the stack flue 42.

The stops 46 and 47 are adjustable to limit the opening movement of the valves 44 and 45. To this end each stop is formed with arms 46ª terminating in angular supporting feet 47ª which rest on the frame of the valve casing, as shown in Fig. 8, and are slotted to receive suitable securing bolts therethrough. It will be understood that these stops while intended to be rigidly secured to the valve casing in various positions of adjustment are in sliding engagement with the valve stems 18 and 19 so that movement of such stems is not arrested by engagement of the valves 44 and 45 with the said stops.

In operation, the valve head is moved from the seat 12 to seat 13, the stems 18 and 19 moving in this direction, and the valves 44 and 45 moving with the stems through friction. When the valve seat 39 and stop 27 is reached, the movement of the valves is arrested, while the stems pass on through for the full length of the stroke and similarly on the return stroke.

The valve seats 12, 13, 39 and 40 are cooled by circulating fluid.

In Figure 7 a modification of the gas valve is shown in which it is arranged in a four-way type. In this case the valve A consists of a metal casing 10 having a fire brick lining 11, the casing being provided intermediate of its length with annular hollow valve seats 12 and 13, and adjacent to the ends with hollow annular valve seats 39 and 40.

The ends of the casing are in this case closed, but gas inlets 60 and 61 are provided. The valve C is in this case provided with a double face which is formed in two sections 20 and 21 which have conical longitudinal conduits 22 and 23 which communicate with the hollow valve stems 18 and 19.

In the end wall of the casing A bushings 62 and 63 are provided through which the stems 18 and 19 slidably pass and guides 64 and 65 are provided in the ends of the casing A and arranged diametrically opposite each other. Hollow valves 66 and 67 are slidably mounted on the stems 18 and 19 and coact with the hollow valve seats 39 and 40, and these valves carry rods 68 and 69 which slidably engage with the guides 64 and 65, the rods being provided with enlarged ends 70 and 71.

On the hollow stems 18 and 19 discs 72 and 73 are mounted and coact with the enlarged ends 70 and 71 of the rods 68 and 69 to move the valves 66 and 67 longitudinally on their respective hollow stems.

The formation of the valve C is similar to that already described and a suitable inlet pipe 29 is provided to supply a cooling liquid which circulates through the valve and afterwards is discharged through an outlet similar to that illustrated in Figure 2.

The stem 19 is connected to the piston rod 31 of the reversible prime mover B which is similar to that illustrated in Figure 1, so that it is not thought necessary to further describe this prime mover.

The casing 10 communicates with checker flues 74 and 75 and with the intermediate stack flue 76.

When the valve is in operation and the gas inlet 60 is in communication with the casing 10 owing to the valve 66 being disengaged from the annular hollow valve seat 39, then gas enters into the casing 10 and passes through the checker work flue 74.

The checker work flue 75 is in this scale in communication with the stack flue 76. When the motion of the prime mover B has been reversed, the valve C will engage with the annular hollow valve seat 13, and the discs 72 engaging with the enlarged ends 70 of the rod 68 will close the valve 66 on the valve seat 39.

During the longitudinal movement of the valve C, the valve 67 on the stem 19 will become disengaged from the valve seat 40, so that the gas flue 61 will in this case communicate with the casing 10 and with the checker work flue 75.

The checker flue 74 will now communicate with the stack flue 76. On the reciprocations of the prime mover B to actuate the valve C, the valves 66 and 67 will be simultaneously actuated, movement of one of these valves lagging behind the movement of the other due to the lost motion provided.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A gas or air reversing valve comprising in combination, a casing, hollow annular valve seats in the casing, flues communicating with the casing, an operating valve comprising a hollow annular valve head, hollow stems formed integral with the valve head, inlet and outlet orifices provided between the valve head and stems, a radially extending pipe in the outlet orifice providing complete circulation of the cooling fluid, means to move the valve longitudinally, whereby one pair of flues are put into communication in one position of the valve, while another pair of flues will be put in communication in another position of the valve.

2. A valve as claimed in claim 1, in which transverse walls are provided in the valve head, separating the same from the hollow stems, inlet and outlet orifices in said walls, a radially extending pipe in the outlet orifice providing complete circulation of the cooling fluid through the valve head, means to move the valve longitudinally, whereby one pair of flues are put into communication in one position of the valve, while another pair of flues will be put into communication in another position of the valve.

3. A valve of the class described, comprising a casing, having open ends, hollow annular valve seats in the casing intermediate of the ends, and hollow annular valve seats on the end of the casing, a valve operating between the first said valve seats, air valves coacting with the last said valve seats, and carried by the first said valve, and means for moving the valves longitudinally.

4. The valve claimed in claim 3, in which checker, stack and checker flues are provided communicating with the valve casing, the first checker and stack flues being in communication when the valve is moved in one direction, and the last checker flue cut off from the stack, and the second checker and stack flue communicating when the valve is in another position and the first checker flue then cut off.

5. The valve claimed in claim 3, in which stop members are provided coacting with the air valves to govern the opening of the same.

In witness whereof I have hereunto set my hand in the presence of two witnesses.

CARL STENBOL.

Witnesses:
R. BARBER,
C. W. WALLS.